United States Patent
Nowlin

(10) Patent No.: US 7,395,421 B1
(45) Date of Patent: Jul. 1, 2008

(54) METHOD AND APPARATUS FOR BOOTING A USER-SELECTABLE OPERATING SYSTEM

(75) Inventor: Dan H. Nowlin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1364 days.

(21) Appl. No.: 09/707,410

(22) Filed: Nov. 6, 2000

(51) Int. Cl.
G06F 15/177 (2006.01)
G06F 1/00 (2006.01)
G06F 9/00 (2006.01)
G06F 3/00 (2006.01)

(52) U.S. Cl. .............................. 713/2; 713/1; 713/100; 713/300; 713/320; 710/8

(58) Field of Classification Search ............. 713/2, 713/200, 320, 300
See application file for complete search history.

(56) References Cited

U.S. PATENT DOCUMENTS

| | | | | |
|---|---|---|---|---|
| 5,142,680 | A * | 8/1992 | Ottman et al. | 717/176 |
| 5,604,890 | A * | 2/1997 | Miller | 703/23 |
| 5,968,174 | A * | 10/1999 | Hughes | 713/2 |
| 5,987,613 | A * | 11/1999 | Busch et al. | 713/300 |
| 6,128,661 | A | 10/2000 | Flanagin et al. | 709/227 |
| 6,178,503 | B1 * | 1/2001 | Madden et al. | 713/2 |
| 6,219,721 | B1 * | 4/2001 | Su | 710/2 |
| 6,327,653 | B1 * | 12/2001 | Lee | 713/100 |
| 6,367,074 | B1 * | 4/2002 | Bates et al. | 711/170 |
| 6,484,309 | B2 * | 11/2002 | Nowlin et al. | 717/100 |
| 6,631,469 | B1 * | 10/2003 | Silvester | 713/2 |
| 7,162,629 | B2 * | 1/2007 | Zimmer et al. | 713/100 |
| 2003/0126335 | A1 * | 7/2003 | Silvester | 710/303 |
| 2003/0154337 | A1 * | 8/2003 | Ohno et al. | 710/260 |
| 2004/0006690 | A1 * | 1/2004 | Du et al. | 713/2 |
| 2004/0237086 | A1 * | 11/2004 | Sekiguchi et al. | 718/100 |

OTHER PUBLICATIONS

Wikipedia, "Windows CE," The free encyclopedia, pp. 3, printed on Jun. 23, 2005, www.en.wikipedia.org/wiki/Windows_CE.
Wikipedia, "Palm OS," The free encyclopedia, pp. 7, printed on Jun. 23, 2005, www.en.wikipedia.org/wiki/Palm_OS.
Wikipedia, "Windows 98," The free encyclopedia, pp. 2, printed on Jun. 23, 2005, www.en.wikipedia.org/wiki/Windows_98.
Microsoft Corporation, "Windows XP Technical Overview," pp. 29, Published May 1, 2001, printed on Jun. 23, 2005, (continued).
www.microsoft.com/technet/prodtecnol/winxppro/evaluate/xptechov.mspx.
www.microsoft.com/technet/prodtecnol/winxppro/evaluate/xptechov.mspx, May 1, 2001.

* cited by examiner

*Primary Examiner*—Ayaz Sheikh
*Assistant Examiner*—Kaveh Abrishamkar
(74) *Attorney, Agent, or Firm*—Blakely, Sokoloff, Taylor & Zafman LLP

(57) ABSTRACT

A computer system includes a memory subsystem to store both a full operating system and a mini operating system. The mini operating system boots much more quickly than the full operating system, and may be a subset of the full operating system. A mechanical switch is provided to the user to select, at power-on, which of the two operating systems the user desires to be booted.

17 Claims, 3 Drawing Sheets

METHOD AND APPARATUS FOR BOOTING A USER-SELECTABLE OPERATING SYSTEM

The present invention relates to computer systems and more particularly to enabling a user to selectively boot a full or a mini operating system as the primary operating system of a computer system.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by the processor, and hence its speed, has been limited by two factors. First, as power consumption increases, the processor tends to run hotter, leading to thermal dissipation problems. Second, the power consumed by a processor may tax the limits of the power supply used to keep the processor operational, reducing battery life in mobile systems and diminishing reliability while increasing cost in larger systems.

Many computer system users use their computer systems as a personal information managers (PIMs), storing calendar and personal contact information to help organize their schedules. To access this information, the user typically must power-on and boot up their computer system using their sole, large operating system, then launch the appropriate calendar and contact application programs. Unfortunately, operating the computer system in this manner to access simple PIM information can be wasteful in terms of time spent waiting for the computer system to boot up and power spent supporting unused features of the operating system and unused peripheral devices.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a computer system includes a memory subsystem to store both a full operating system (OS) and a mini OS. The full OS may be much larger than the mini OS, and may provide more features and functionality to the computer system than the mini OS. As a tradeoff, however, the full OS may consume significantly more power than the mini OS (i.e. the computer system may consume significantly more power when operating on the full OS than on the mini OS). In addition, the full OS may take significantly longer to boot than the mini OS.

A feature is provided to the user to select, at power-on, which of the two operating systems the user desires to be booted as the primary OS of the system. For example, if the user only needs to use the computer as a personal information manager (PIM) to check their calendar or their address book, the user may select to boot the mini OS which supports these basic features. If, however, the user needs to use the computer to perform complex spreadsheet, networking, or word processing tasks, the user may select to boot the full OS which supports these more complex features.

Selectively reducing boot time and power consumption in this manner increases the usability, flexibility, and battery life of the computer system. A more detailed description of embodiments of the present invention, including various configurations and implementations, is provided below.

Figure 1:
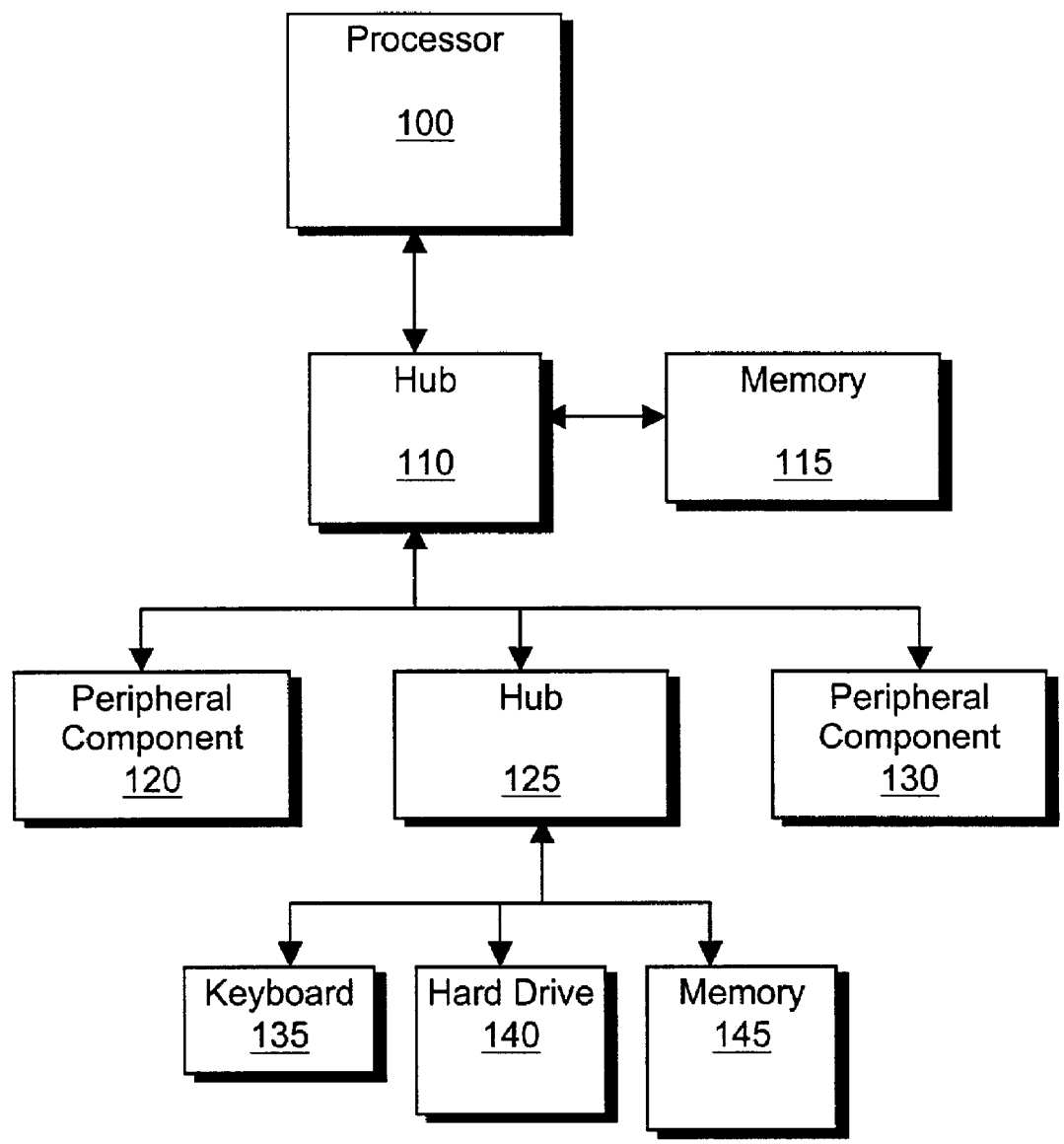
FIG. 1 is a computer system formed in accordance with an embodiment of the present invention.

FIG. 1 is a computer system formed in accordance with an embodiment of the present invention. Hub 110 couples processor 100 to memory 115 as well as to hub 125 and to one or more additional peripheral components 120 and 130, such as audio and video input/output devices. Hub 125 additionally couples other peripheral components, such as keyboard 135, hard drive 140, and memory 145, to the rest of the system. Note that a method of the present invention may be implemented by the computer system of FIG. 1 programmed to execute various steps of the method. This program may reside, at least in part, on any computer readable medium such as a magnetic disk (e.g. a hard drive or floppy disk), an optical disk (e.g. a CD or DVD), a semiconductor device (e.g. Flash, EPROM, or RAM), or carrier wave, all of which are represented by memory components 115, 140, or 145 of FIG. 1.

In accordance with one embodiment of the present invention, both the mini OS and the full OS are stored on hard drive 140 of FIG. 1. The mini OS may be, in whole or in part, a subset of the full OS, or the mini OS may be an altogether different OS. For one embodiment of the present invention, the mini OS may be, for example, Windows* CE or other PIM-oriented OS, and the full OS may be, for example, Windows 2000, or other desktop-oriented OS. Both of these OSs are manufactured by Microsoft Corporation of Redmond, Wash. (*Third party marks and brands are the property of their respective owners).

In accordance with an embodiment of the present invention, the mini OS is much smaller than the full OS and boots much more quickly than the full OS. For one embodiment, the mini OS boots in less than one tenth the amount of time it takes to boot the full OS, and the mini OS is less than one tenth the size of the full OS. In addition, the mini OS consumes significantly less power than the full OS. The tradeoff, however, is that the mini OS may only support basic PIM functionality, including, for example, calendaring and address book features, whereas the full OS may support networking, complex spreadsheet and database applications, word processing, and audio and video applications.

In accordance with an embodiment of the present invention, at power-on, boot code is loaded into memory 115 from memory 145 in the computer system of FIG. 1. This boot code may include all or a portion of a basic input/output system (BIOS) code stored in non-volatile memory 145. This boot code is executed by processor 100 to determine the state of keyboard 135, or other mechanical switch, at power-on. Note that, as used herein, the term "at power-on" is intended to mean during the period of time, soon after the computer system is switched on, when the computer system determines the state of its keyboard, or other mechanical switch, for purposes of selecting which of at least two operating systems to boot, without prompting the user to make the selection. Based on the state of this mechanical switch, as set by the user, all or a portion of either the full OS or the mini OS may be loaded into memory 115 and executed by processor 100 of FIG. 1.

Figure 2A:
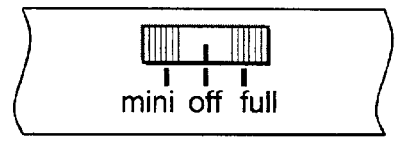
FIGS. 2a-2c are different embodiments of mechanical switches in accordance with embodiments of the present invention.
Figure 2B:
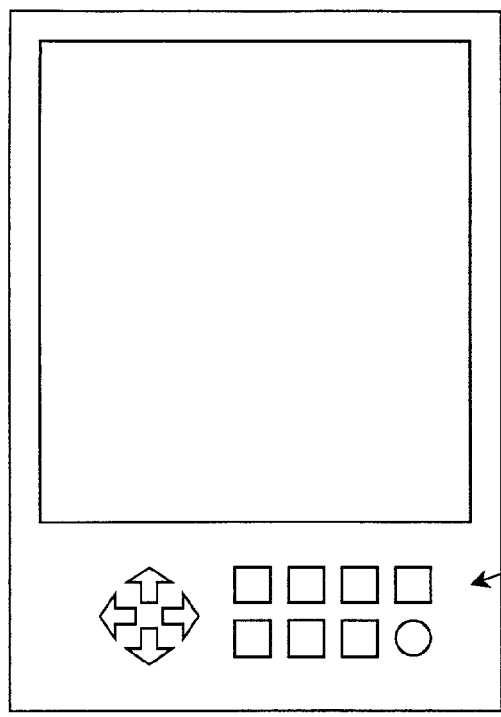
Figure 2C:
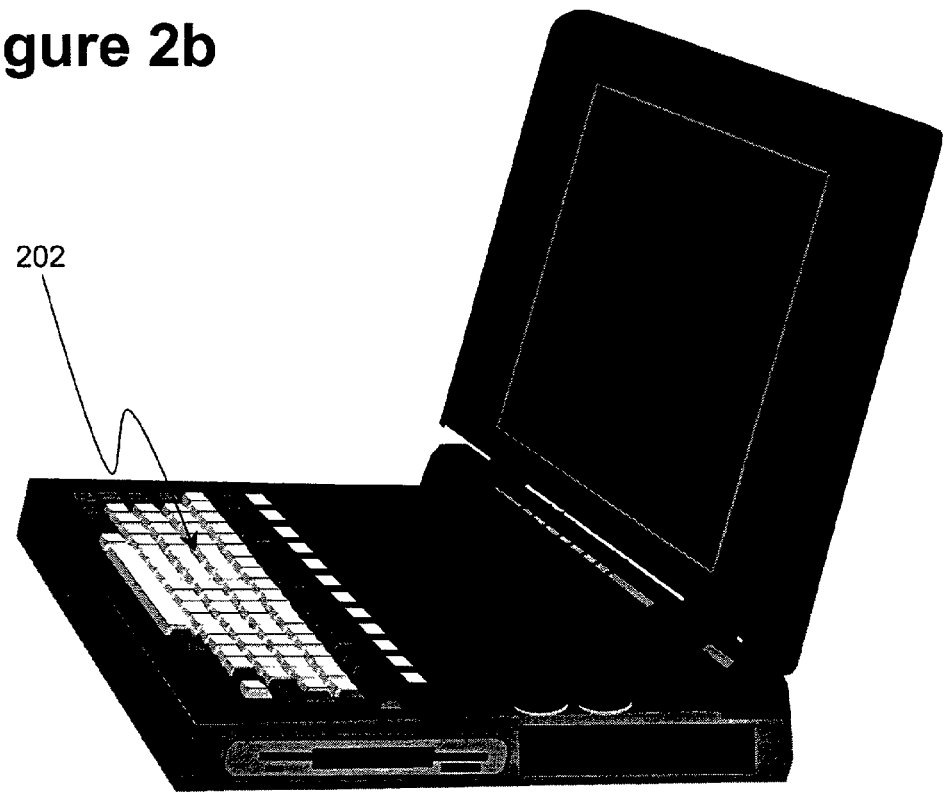

FIGS. 2a-2c show different embodiments of mechanical switches in accordance with embodiments of the present invention. FIG. 2a is an example in which the mechanical switch is a power switch of the computer system. As shown, the switch of FIG. 2a may be placed in one of two different states at power-on. In a first state, the switch is slid to the right, and the computer system boots the full OS. In a second state, the switch is slid to the left, and the computer system boots the mini OS.

FIG. 2b is an example in which the computer system is a hand-held device, and the mechanical switch includes keypad 201. A first state may be indicated by keypad 201 of FIG. 2b when the user holds down (or, alternatively, refrains from holding down) one or more keys at power-on. A second state may be indicated when the user holds down one or more different keys at power-on. Similarly, FIG. 2c is an example in which the computer system is a notebook or laptop device, and the mechanical switch includes keyboard 202. As in the case of the hand-held device of FIG. 2b, a first state may be indicated by keyboard 202 of FIG. 2c when the user holds down (or, alternatively, refrains from holding down) one or more keys at power-on. A second state may be indicated when the user holds down one or more different keys at power-on.

For example, for the embodiment of FIG. 2c, a first state may be indicated by the user by holding down the right shift key during power-on. A second state may be indicated by holding down the left shift key during power-on. Third and fourth states may be indicated by holding down the Ctrl key or the Alt key, respectively, at power-on, while a fifth state may be indicated by not holding down any keys at power-on.

In accordance with one embodiment of the present invention, the mini OS may not provide support for the operation of all components of the computer system. For example, referring again to the computer system FIG. 1, for one embodiment of the present invention, the mini OS does not support the operation of peripheral components 120 and 130. For this embodiment, to reduce boot time and power consumption, power is not applied to peripheral components 120 and 130 if it is determined, according to the state of keyboard 135, that the mini OS is to be booted.

Figure 3:
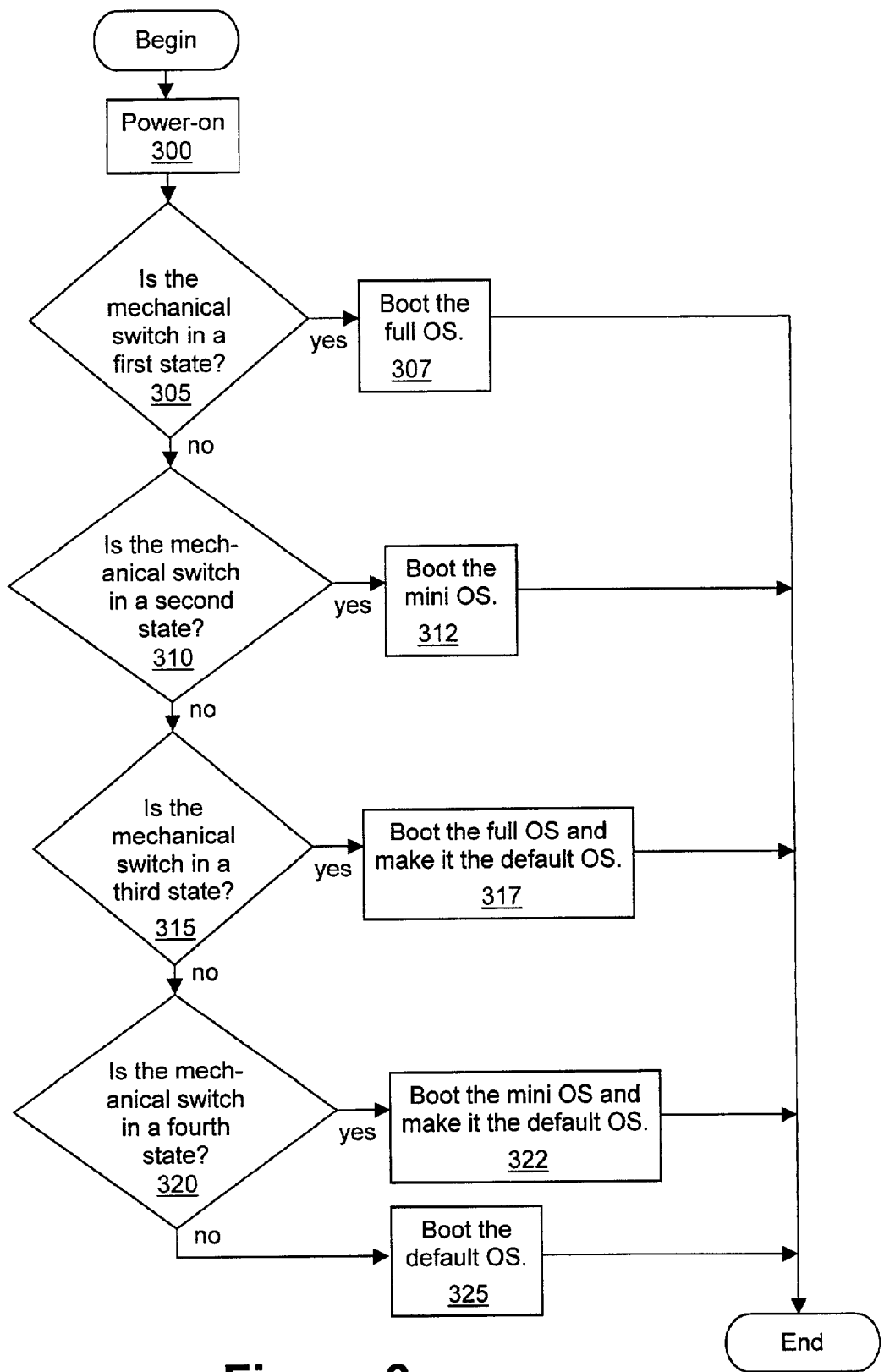
FIG. 3 is a flow chart showing a method of the present invention

FIG. 3 is a flow chart showing a method of the present invention. At step 300, power-on occurs and the computer system attempts to determine the state of a mechanical switch (e.g. a multi-positional power switch, keypad, or keyboard as described above). If it is determined, at step 305, that the mechanical switch is in a first state, then the full OS may be booted as the primary OS of the computer system at step 307. If, however, it is determined, at step 305, that the mechanical switch is not in a first state, then it is determined, at step 310, if the mechanical switch is in a second state.

If it is determined, at step 310, that the mechanical switch is in the second state, then the mini OS may be booted as the primary OS of the computer system at step 312. If, however, it is determined, at step 310, that the mechanical switch is not in the second state, then it is determined, at step 315, if the mechanical switch is in a third state.

If it is determined, at step 315, that the mechanical switch is in the third state, then the full OS may be booted as the primary OS of the computer system at step 317. In addition, at step 317, in accordance with one embodiment of the present invention, the full OS is made the default OS. This may be accomplished by storing, in a storage location of the computer system that is accessible during the pre-boot period, a pointer to the address location of the full OS in hard drive 140 of FIG. 1. The storage location of this pointer may be, for example, memory 145, where other boot code is stored. In accordance with an alternate embodiment of the present invention, the default OS may be selected by the user during a previous, post-boot work session on the computer system using the appropriate OS tools.

Referring again to FIG. 3, if it is determined, at step 315, that the mechanical switch is not in the third state, then it is determined, at step 320, if the mechanical switch is in a fourth state. If the mechanical switch is in the fourth state, then the mini OS may be booted as the primary OS of the computer system at step 322. In addition, at step 322, in accordance with one embodiment of the present invention, the mini OS is made the default OS by, for example, storing a pointer to the address location of the mini OS in a non-volatile storage location.

If, however, it is determined, at step 320, that the mechanical switch is not in the fourth state, then, at step 325, the default OS is booted as the primary OS of the computer system. This default OS is determined by accessing the storage location in which the above-described pointer is stored.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
a first memory subsystem to store a full operating system (OS) and a mini operating system;
a mechanical switch having a first state and a second state;
a first circuit to execute a boot code and to determine a state of the mechanical switch at power-on; and
a second circuit to boot the full OS as a primary OS of the computer system if the first circuit determines that the mechanical switch is in the first state at power-on and to boot the mini OS as the primary OS of the computer system if the first circuit determines that the mechanical switch is in the second state at power on, wherein the mechanical switch has a third and a fourth state, the second circuit to boot the full OS as the primary OS of the computer system and to make the full OS the default OS if the first circuit determines that the mechanical switch is in the third state at power-on, and to boot the mini OS as the primary OS of the computer system and to make the mini OS the default OS if the first circuit determines that the mechanical switch is in the fourth state at power-on, and wherein the mechanical switch has a fifth state, the second circuit to boot the default OS as the primary OS of the computer system if the first circuit determines that the mechanical switch is in the fifth state at power-on, the default OS being either the full OS or the mini OS based on user-defined setting in the computer system.

2. The computer system of claim 1, further comprising a storage location to store a point to the default OS.

3. The computer system of claim 1, wherein the first circuit includes a processor, and the second circuit includes the processor and a second memory subsystem into which at least a portion of the full OS or the mini OS is loaded if the mechanical switch is in the first state or the second state, respectively, at power-on.

4. The computer system of claim 1, wherein the mechanical switch is a keyboard.

5. The computer system of claim 1, wherein the mechanical switch is a power switch.

6. The computer system of claim 1, wherein the full OS takes at least ten times longer to boot than the mini OS, and the full OS is at least ten times the size of the mini OS.

7. The computer system of claim 1, wherein the mini OS is a subset of the full OS.

8. A method comprising:
   enabling a user to boot a full operating system (OS) as a primary OS on a computer system by placing a mechanical switch in a first state at power-on;
   enabling the user to boot a mini OS as the primary OS on the computer system by placing the mechanical switch in a second state at power-on;
   enabling the user to boot a default OS as the Primary OS on the computer system by placing the mechanical switch in a third state at power-on, the default OS being either the full OS or the mini OS based on user-defined setting in the computer system;
   enabling the user to boot the full OS as the primary OS on the computer system and to make the full OS the default OS by placing the mechanical switch in a fourth state at power-on; and
   enabling the user to boot the mini OS as the primary OS on the computer system and to make the mini OS the default OS by placing the mechanical switch in a fifth state at power-on.

9. The method of claim 8, wherein placing the mechanical switch in the first state includes holding down one or more first keys, and placing the mechanical switch in the second state includes holding down one or more second keys.

10. The method of claim 8, wherein placing the mechanical switch in the first state includes sliding the mechanical switch to a first position.

11. The method of claim 10, wherein the mechanical switch is a power switch of the computer system.

12. The method of claim 10, wherein placing the mechanical switch in the second state includes sliding the mechanical switch to a second position.

13. The method of claim 12, wherein the mechanical switch is a power switch of the computer system.

14. A computer system programmed to implement the method of claim 8.

15. A computer system programmed to implement the method of claim 8.

16. A computer-readable medium including a plurality of instructions readable therefrom, the instructions, when executed by a computer system, cause the computer system to perform operations comprising:
   determining a state of a mechanical switch at power-on;
   booting a full operating system (OS) as a primary OS on the computer system if it is determined that the mechanical switch is in a first state at power-on; and
   booting a mini OS as the primary OS on the computer system if it is determined that the mechanical switch is in a second state at power-on, wherein the operations further comprise booting a default OS as the primary OS of the computer system if it is determined that the mechanical switch is in a third state at power-on;
   booting the full OS as the primary OS on the computer system and making the full OS the default OS if it is determined that the mechanical switch is in a fourth state at power-on; and
   booting the mini OS as the primary OS on the computer system and making the mini OS the default OS if it is determined that the mechanical switch is in a fifth state at power-on.

17. The computer readable medium of claim 16, wherein booting the full OS takes at least ten times longer than booting the mini OS, and the mini OS is a subset of the full OS.

\* \* \* \* \*